United States Patent [19]

Chen et al.

[11] Patent Number: 5,271,784
[45] Date of Patent: Dec. 21, 1993

[54] METHOD FOR MANUFACTURING COMPOSITE BICYCLE FRAMES

[75] Inventors: Jong-Pyng Chen; Jen-Loong Hwang, both of Hsinchu; Ruey-Guang Jang, Miaoli Hsien; Sheng-Long Wu, Hualien Hsien; Rong-Ho Yu, Taipei Hsien, all of Taiwan

[73] Assignee: Industrial Technology Research Institute, Hsinchu, Taiwan

[21] Appl. No.: 993,358

[22] Filed: Dec. 18, 1992

[51] Int. Cl.⁵ .............................................. B29C 43/36
[52] U.S. Cl. ............................ 156/156; 156/245; 264/258; 264/314; 280/281.1; 280/288.3; 403/358; 403/314
[58] Field of Search ............... 156/155, 156, 242, 245; 280/200, 281.1, 288.3, 274, 275; 403/265, 268, 292; 264/258, 314

[56] References Cited

U.S. PATENT DOCUMENTS

| | | | |
|---|---|---|---|
| 4,828,781 | 5/1989 | Duplessis | 264/250 |
| 4,850,607 | 7/1989 | Trimple | 280/281.1 |
| 4,889,355 | 12/1989 | Trimple | 280/281.1 |
| 4,902,458 | 2/1990 | Trimple | 264/46.6 |
| 4,941,674 | 7/1990 | Trimple | 280/281.1 |
| 4,982,975 | 1/1991 | Trimple | 280/281.1 |
| 4,986,949 | 1/1991 | Trimple | 264/258 |
| 5,076,601 | 12/1991 | Duplessis | 280/281.1 |
| 5,080,385 | 1/1992 | Duplessis | 280/281.1 |
| 5,116,071 | 5/1992 | Calfee | 280/281.1 |

Primary Examiner—Caleb Weston
Attorney, Agent, or Firm—Ladas & Parry

[57] ABSTRACT

A method for manufacturing a composite bicycle frame adapts stepped forming. The seat stays combined with the seat support means which are connected to parts of the top tube and seat tube, and the chain stays combined with the pedal support means which are connected to parts of the down tube and seat tube, are formed respectively. The seat stays connect to the chain stays by inserting a pair of rear wheel dropouts therebetween, to form substantially a pair of rear triangles of the bicycle frame. The seat tube and the steering support means connected to the top tube and down tube are laid up respectively. The cured rear triangles connect to uncured seat tube and steering support means associated with top tube and down tube, wherein the top tube, down tube, and seat tube form a front triangle. The front triangle is cured such that manufacturing of the whole bicycle frame is completed.

9 Claims, 9 Drawing Sheets

METHOD FOR MANUFACTURING COMPOSITE BICYCLE FRAMES

BACKGROUND OF THE INVENTION

1. Field of the Invention

This invention relates generally to a method for manufacturing a composite bicycle frame with high strength and light weight.

2. Description of the Prior Art

Conventional bicycle frames are principally made from metallic materials which are developed from iron to chromium molybdenum steel and aluminum alloy. The weight of the metallic bicycle frame is relatively heavy because the higher specific gravity of metallic materials. Accordingly, a bicycle frame made from non-metallic materials such as carbon fiber composite materials has been developed.

The performance characteristics of carbon fiber composite materials are light weight, high specific strength, high specific rigidity, etc. The carbon fiber composite materials are applied to bicycle frames to reduce the weight. For conventional bicycle frames, the lug type carbon fiber bicycle frames take a large number. Bicycle frames of this type are made from individual carbon fiber tubes which are joined together by adhering aluminum joints therebetween. However, such bicycle frames have a serious problem, that is, the stress transferred between joints and carbon fiber tubes is only achieved by adhesive therebetween so that the strength is relatively weak. Hence the qualities of the bicycle frames are determined by whether the joint conditions are strong enough to support the frames. Furthermore, it is easy to cause stress concentrations and discontinuity around lug-tube joint of the frame because of different rigidity of distinct materials. A monocoque type frame has been developed to overcome the preceding drawbacks, that is, the whole frame is made from composite materials with metallic parts embedded in suitable positions, if necessary. Some manufactured monocoque type frames have been disclosed in U.S. Pat. Nos. 4,850,607, 4,889,355 and 4,902,458. These frames may provide advantages over conventional bicycle frames, due in some instances to increased strength and a reduced number of major structural joints. However, these frames have the following drawbacks:

(a) The method of molding the frame structure employs a female molding unit having three mold pieces. The whole molding unit is too thick (about 20 to 25 cm) and has heavy weight. It is difficult to transfer heat from the molding unit to the frame such that the molding process is slow and the frame has a longer molding cycle resulting in reduced production. If the molding unit is made from metallic materials, the manufacture of the molding unit is expensive because the large-sized molding unit and processing machinery, and the precision requirement.

(b) The frame is integrally molded by three mold pieces. It is inconvenient to place the laid up prepreg in the molding cavities and to assemble the separate mold pieces together because of the large-sized mold pieces. The prepreg is easily pinched by the mold pieces, particularly, the intermediate rear mold piece inserted between the right and left stays of the rear triangle frame component makes it easy to pinch the prepreg when the rear mold piece is pushed in to fit with the other mold pieces.

(c) The chain stay portions and the seat stay portions are formed by laying up resin impregnated fabric around solid foamable cores without using the better way of inflation. The frame which is formed by inflatable bladders has the advantages of as low cost, high strength, and light weight. However, the frame which is formed by using the foamed cores will increase its weight about 50 to 100 g since they are not easy to be removed and have to be left in place. If the foamed cores are removed by dissolution in an solvent to decrease the weight of the frame, the foam cores must use thermoplastics and the Tg of soluble thermoplastic foam is usually lower than 110° C. It should be noted that the molding temperature of composite materials is about 120° to 150° C., the foam cores will shrink at this temperature range (above the Tg). The shrinking will affect the quality of the frame because the pressure exerted by the foamed cores is not sufficient for adequate compaction. Furthermore, to remove the foamed cores by dissolution in an solvent is time-consuming and costly, and the solvent may weaken the strength of composite materials and cause pollution problem.

(d) The tube portions are formed by overlapping the opposite parts of adjacent wall sections, wherein fibers at the overlapping edges are discontinuous (sheared between the overlapping edges). The frame may not have the necessary structural strength because the stress loadings are transferred from one wall section to the overlapping wall section just by the resin therebetween. In other words, the molded juncture is as strong as the resin between the overlapping wall sections. It is easy to rupture the frame at the overlapping edges after a certain period of using.

SUMMARY OF THE INVENTION

The present invention relates to a method for manufacturing a composite bicycle frame. The bicycle frame is constructed using plies of resin impregnated fiberglass fibers, carbon fibers and KEVLAR ® fibers. The bicycle frame comprises a top tube extending between steering support means for supporting a fork assembly and seat support means for supporting a seat assembly; a down tube extending between the steering support means and pedal support means for supporting a pedal assembly; a seat tube extending between the pedal support means and the seat support means; a pair of seat stays, extending from the seat support means, are connected to a pair of chain stays extending from the pedal support means by a pair of rear wheel dropouts for supporting a rear wheel assembly.

The wall thickness of the cured bicycle frame is from about 35 to 125 mils. Cut prepregs, resin impregnated fibers in uncured state, are initially laid up around mandrels having size and shape depending upon various portions of the frame. The mandrel is inserted in a mount and consists of a rubber sleeve (e.g. silicone rubber) and an aluminum bar, and the thickness of cured composite materials subtracted from the outside diameter of the corresponding cured portion of the frame substantially gives the outside diameter of the mandrel. The prepreg may be unidirectional or woven fibers. Normally, the unidirectional fibers are preferred, and these fibers are oriented at angles between 0° to 45°. The number of plies and angle of prepreg is determined by structural analysis based on mechanics; hence the top tube portion, down tube portion, seat tube portion, seat stay portions and chain stay portions may have different ply numbers, fiber orientation and stack sequence. Each ply of prepreg is laid up and shifted around the mandrel without having the gap between the leading and the trailing edges of each prepreg to underlie other gap for greater strength. The mandrel is pulled out when sufficient plies of prepregs are laid up to achieve the corresponding shape and strength of each portion of the bicycle frame.

Nylon bladders with thickness about 50 to 150 $\mu$ are generally used, wherein the outside diameter of the bladder has about the same or greater than the inner diameter of cured portion. For some locations where the bladder is hard to reach, foamable or foamed cores may be filled so that pressure can be transferred by inflating inflatable bladders placed in the tubular components and passing through the foamable cores. The bladders are inflated to a pressure of about 15 psig to about 500 psig, preferably to about 100 psig. Heat is applied to the mold to cure the prepreg in accordance with the resin manufacturer's recommendations. For example, if the material from the TOHO company is used, the mold is heated to a temperature of about 250° F. When the prepreg is cured, the mold is opened and the integral bicycle frame can be removed. The bladders may be removed, or may be left within the interior of the frame because of their insignificant weight.

An object of the present invention is to provide a method for manufacturing a composite bicycle frame with high quality and productivity in which the seat stays combining with the seat support means which are connected to parts of the top tube and seat tube are formed firstly, the chain stays combined with the pedal support means which are connected to parts of the down tube and seat tube are then formed integrally, the seat stays connect to the chain stays by inserting a pair of rear wheel dropouts therebetween, to form substantially a pair of rear triangles of the bicycle frame; the seat tube and the steering support means connected to the top tube and down tube are laid up respectively; the cured rear triangles connect to uncured seat tube and steering support means associated with top tube and down tube, wherein the top tube, down tube, and seat tube form a front triangle; the front triangle is cured such that the manufacturing of the whole bicycle frame is completed.

A further object of the present invention is to provide a method for manufacturing a composite bicycle frame which adapts a way of stepped forming to avoid the manufacturer's having to discard the whole frame so that high production yield can be achieved, if the seat support means or the pedal support means has structural defects.

A further object of the present invention is to provide a method for manufacturing a composite bicycle frame, wherein all tubular portions are formed by inflatable bladders and have the advantages of low cost and reliable quality.

Another object of the present invention is to provide a method for manufacturing a composite bicycle frame, wherein the uncured combination of the seat stays and the seat support means associated with parts of the top tube and seat tube is placed in a first female molding unit having four mold pieces to be cured; and the uncured combination of the chain stays and the pedal support means associated with parts of the down tube and seat tube is placed in a second female molding unit having four mold pieces to be cured. Each female molding unit includes a right side mold piece and a corresponding left side mold piece capable of being assembled horizontally and an upper mold piece and a corresponding lower mold piece capable of being assembled in a vertical direction without pinching the prepreg.

These and other objects, advantages and features of the present invention will be more fully understood and appreciated by reference to the written specification.

DETAILED DESCRIPTION OF THE INVENTION

Figure 1:
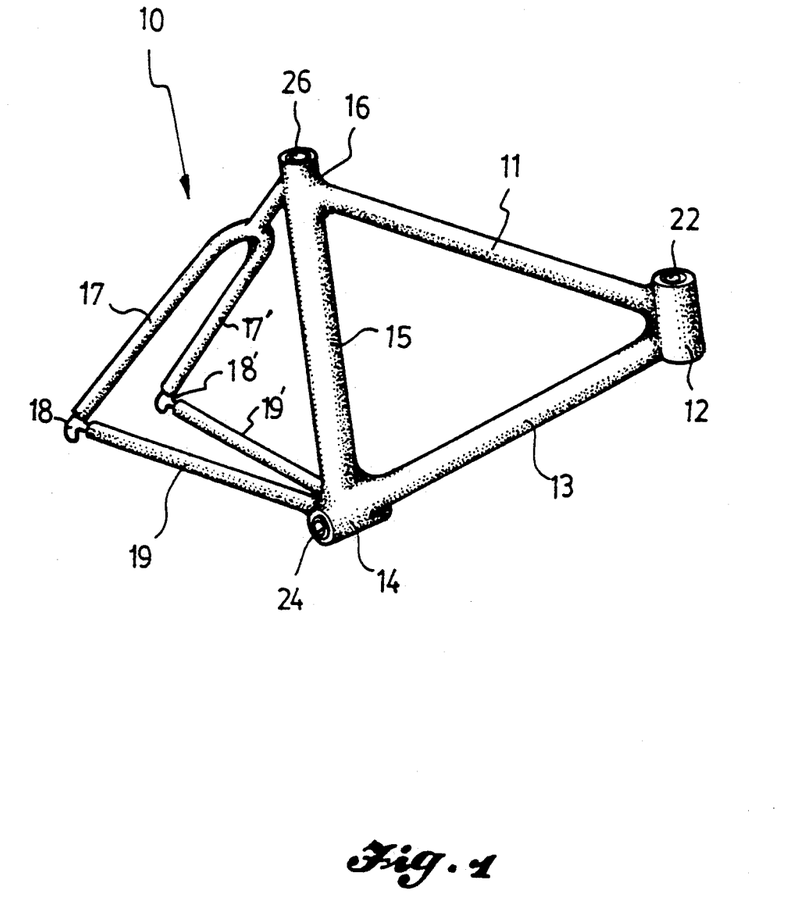
FIG. 1 is a perspective view illustrating a bicycle frame.

Referring now to FIG. 1, a bicycle frame 10 manufactured by the method of the present invention comprises a top tube 11 extending between steering support means 12 for supporting a fork assembly (not shown) and seat support means 16 for supporting a seat assembly (not shown); a down tube 13 extending between steering support means 12 and pedal support means 14 for supporting a pedal assembly (not shown); a seat tube 15 extending between pedal support means 14 and seat support means 16; a first and a second seat stays 17, 17', the first seat stay 17 extending from the right side of seat support means 16 to connect one end of a rear wheel dropout 18 and the second seat stay 17' extending from the left side of seat support means 16 to connect one end of a rear wheel dropout 18'; and a first and a second chain stays 19, 19', the first chain stay 19 extending from the right side of pedal support means 14 to connect the other end of the rear wheel dropout 18 and the second chain stay 19' extending from the left side of pedal support means 14 to connect the other end of the rear wheel dropout 18'.

The top tube 11, down tube 13, and seat tube 15 form an open front triangle, and the seat tube 15, seat stays 17, 17' and chain stays 19, 19' form a pair of open rear triangles, with the seat tube 15 being the common side of the front and rear triangles. A seat support sleeve 26 may be embedded within the seat support means 16, a steering support sleeve 22 may be embedded within the steering support means 12, and a bottom bracket sleeve 24 may be embedded within the pedal support means 14.

Figure 2:
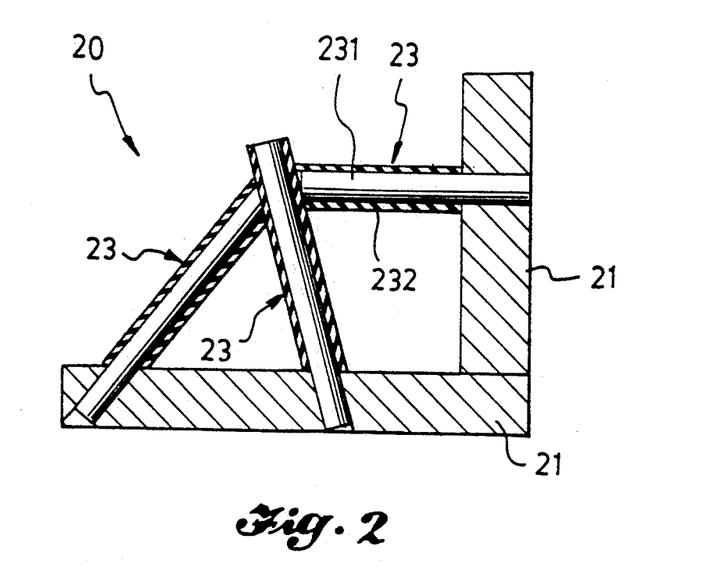
FIG. 2 is a sectional view illustrating a mount for laying up the seat support means and parts of the top tube, seat tube and seat stays of a bicycle frame.
Figure 3:
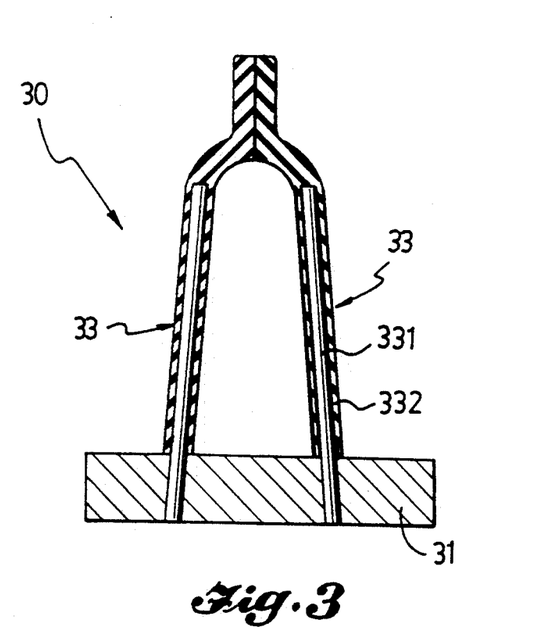
FIG. 3 is a sectional view illustrating a mount for laying up the seat stays of a bicycle frame.

Firstly, this method of the present invention forms the seat stays 17, 17', seat support means 16 and parts of the top tube 11 and seat tube 15 connected thereto. In FIG. 2, a mount 20 for laying up the seat support means 16 and parts of the top tube 11, seat tube 15 and seat stays 17, 17' comprises two bases 21 and three mandrels 23. The bases 21 are connected in a vertical position. Each mandrel 23 comprises an aluminum bar 231 with one end inserted in the base 21 and a rubber sleeve 232 detachably covering the outside of the aluminum bar 231. The combination of three mandrels 23 forms the corresponding shape of the seat support means 16 and parts of the top tube 11, seat tube 15 and seat stays 17, 17'. In FIG. 3, a mount 30 for laying up the seat stays 17, 17' comprises a base 31 and two mandrels 33. Each mandrel 33 comprises an aluminum bar 331 with one end inserted in the base 31 and a rubber sleeve 332 detachably covering the outside of the aluminum bar 331. Rubber sleeves 332 supported by each aluminum bar 331 are symmetrical and form the corresponding shape of the seat stays 17, 17'. The prepreg is laid up around mandrels 23, 33 to get sufficient plies. The aluminum bars 231, 331 are pulled out and prepreg layers are still in contact with rubber sleeves 232, 332, and then rubber sleeves 232, 332 can be easily pulled out because of its flexibility and hollow inside. The uncured seat stays 17, 17' of the prepreg lay-up connect with the uncured seat support means 16 and parts of the top tube 11, seat tube 15 and seat stays 17, 17' of the prepreg lay-up with an overlapping amount of about 4 to 6 cm.

Figure 4:
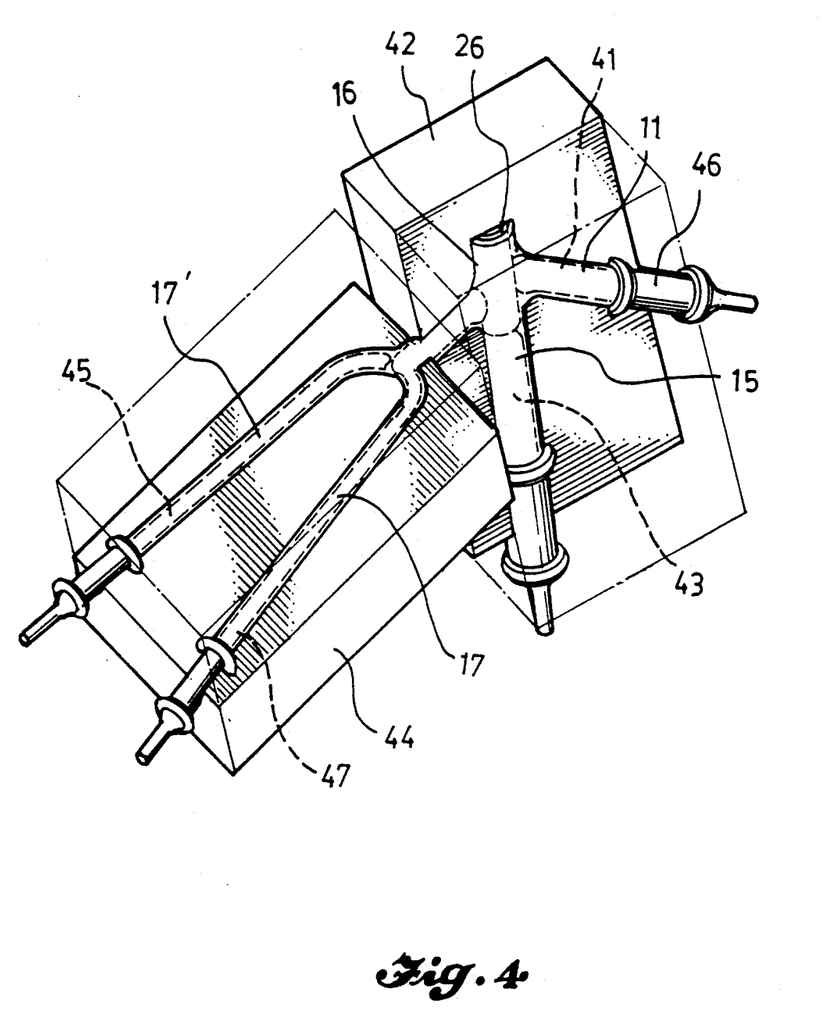
FIG. 4 is a perspective view illustrating the combination of the seat stays and the seat support means associated with parts of the top tube and seat tube being placed in a left side mold piece and a lower mold piece.

As shown in FIG. 4, the seat support sleeve 26 can be embedded in the seat support means 16. A bladder 41 is placed in the part of top tube 11; a bladder 43 is placed in the seat support means 16 and the part of seat tube 15; and bladders 47, 45 are placed in the seat stays 17, 17' respectively, wherein the length of one of the bladders 47, 45 can be longer than that of the other in order to compress the interiors of the seat stays 17, 17' when the bladders 47, 45 are inflated. Each bladder is connected to an air nozzle for inflating. For example, the bladder 41 is connected to an nozzle 46, and the same description of the other nozzles are omitted. For molding the combination of the seat stays 17, 17' and the seat support means 16 associated with parts of the top tube 11 and seat tube 15, the present invention employs a female molding unit having four mold pieces. This combination is placed in the four mold pieces and then the mold pieces are assembled and secured together by appropriate fasteners. The thickness of each of the mold pieces is merely about 4.5 to 7 cm to reduce weight and cost and the heat is transferred from the mold pieces easily and evenly. Accordingly, the molding period of making the bicycle frame in accordance with the present invention is much shorter. Only a left side mold piece 42 and a lower mold piece 44 are shown in FIG. 4, and corresponding right side mold piece and upper mold piece are omitted for clarity. The right side mold piece and the left side mold piece are assembled in a horizontal direction and the upper mold piece and the lower mold piece are assembled in a vertical direction without pinching the prepreg. The bladders are then inflated to a pressure of about 100 psig and the mold pieces are heated to a temperature of about 250° F. When the resin is cured, the mold pieces are opened, and the frame part can be removed.

Figure 5:
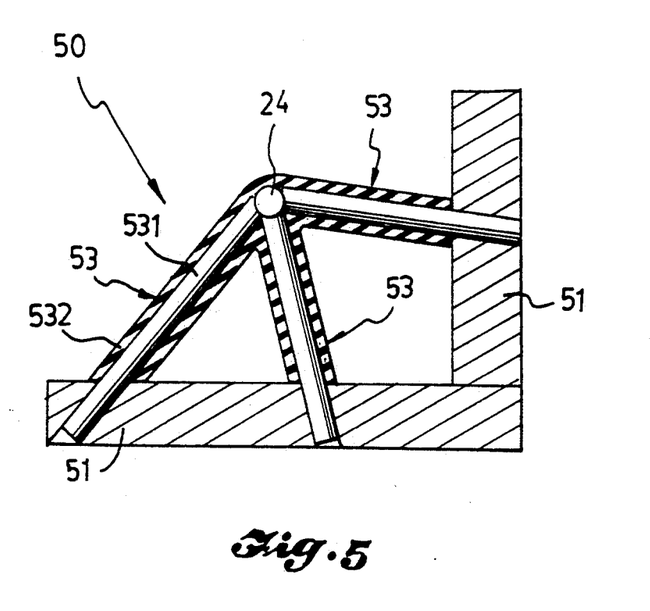
FIG. 5 is a sectional view illustrating a mount for laying up the pedal support means and parts of the down tube, seat tube and chain stays of a bicycle frame.
Figure 6:
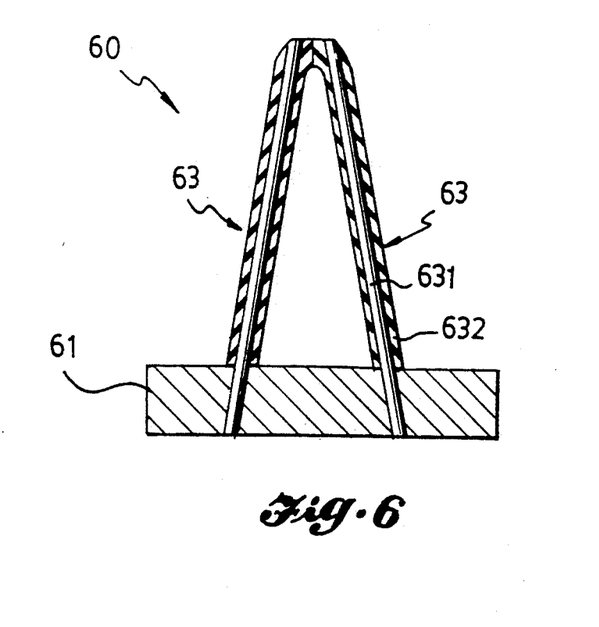
FIG. 6 is a sectional view illustrating a mount for laying up the chain stays of a bicycle frame.

In FIG. 5, a mount 50 for laying up the pedal support means 14 and parts of the down tube 13, seat tube 15 and chain stays 19, 19' comprises two bases 51 and three mandrels 53. The bases 51 are connected in a vertical position. Each mandrel 53 comprises an aluminum bar 531 with one end inserted in the base 51 and a rubber sleeve 532 detachably covering the outside of the aluminum bar 531. The combination of three mandrels 53 forms the corresponding shape of the pedal support means 14 and parts of the down tube 13, seat tube 15 and chain stays 19, 19'. In FIG. 6, a mount 60 for laying up the chain stays 19, 19' comprises a base 61 and two mandrels 63. Each mandrel 63 comprises an aluminum bar 631 with one end inserted in the base 61 and a rubber sleeve 632 detachably covering the outside of the aluminum bar 631. Rubber sleeves 632 supported by each aluminum bar 631 are symmetrical and form the corresponding shape of the chain stays 19, 19'. The prepreg is laid up around mandrels 53, 63 to get sufficient plies. The bottom bracket sleeve 24 can be embedded within the pedal support means 14 when the pedal support means 14 is laid up. The aluminum bars 531, 631 and rubber sleeves 532, 632 are pulled out in sequence to form the uncured chain stays 19, 19' of the prepreg lay-up to connect with the uncured pedal support means 14 and parts of the down tube 13, seat tube 15 and chain stays 19, 19' of the prepreg lay-up.

Figure 7:
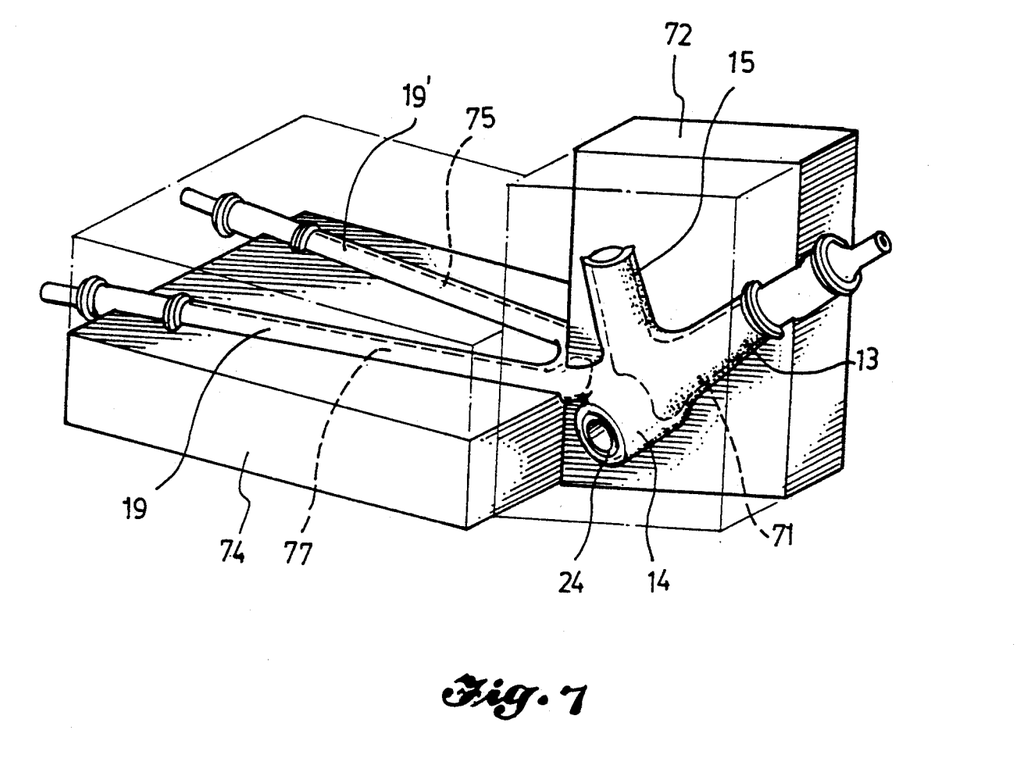
FIG. 7 is a perspective view illustrating the combination of the chain stays and the pedal support means associated with parts of the down tube and seat tube being placed in a left side mold piece and a lower mold piece.

As shown in FIG. 7, a bladder 71 is placed in part of down tube 13 and seat tube 15; and bladders 77, 75 are placed in the chain stays 19, 19' respectively, wherein the length of one of the bladders 77, 75 can be longer than that of the other in order to compress the interiors of the chain stays 19, 19' when the bladders 77, 75 are inflated. For molding the combination of the chain stays 19, 19' and the pedal support means 14 associated with parts of the down tube 13 and seat tube 15, the present invention employs a female molding unit having four mold pieces. This combination is placed in the four mold pieces and then the mold pieces are assembled and secured together by appropriate fasteners. Only a left side mold piece 72 and a lower mold piece 74 are shown in FIG. 7, and corresponding right side mold piece and upper mold piece are omitted for clarity. The bladders are then inflated to a pressure of about 100 psig and the mold pieces are heated to a temperature of about 250° F. When the resin is cured, the mold pieces are opened, and the frame part can be removed.

Figure 8:
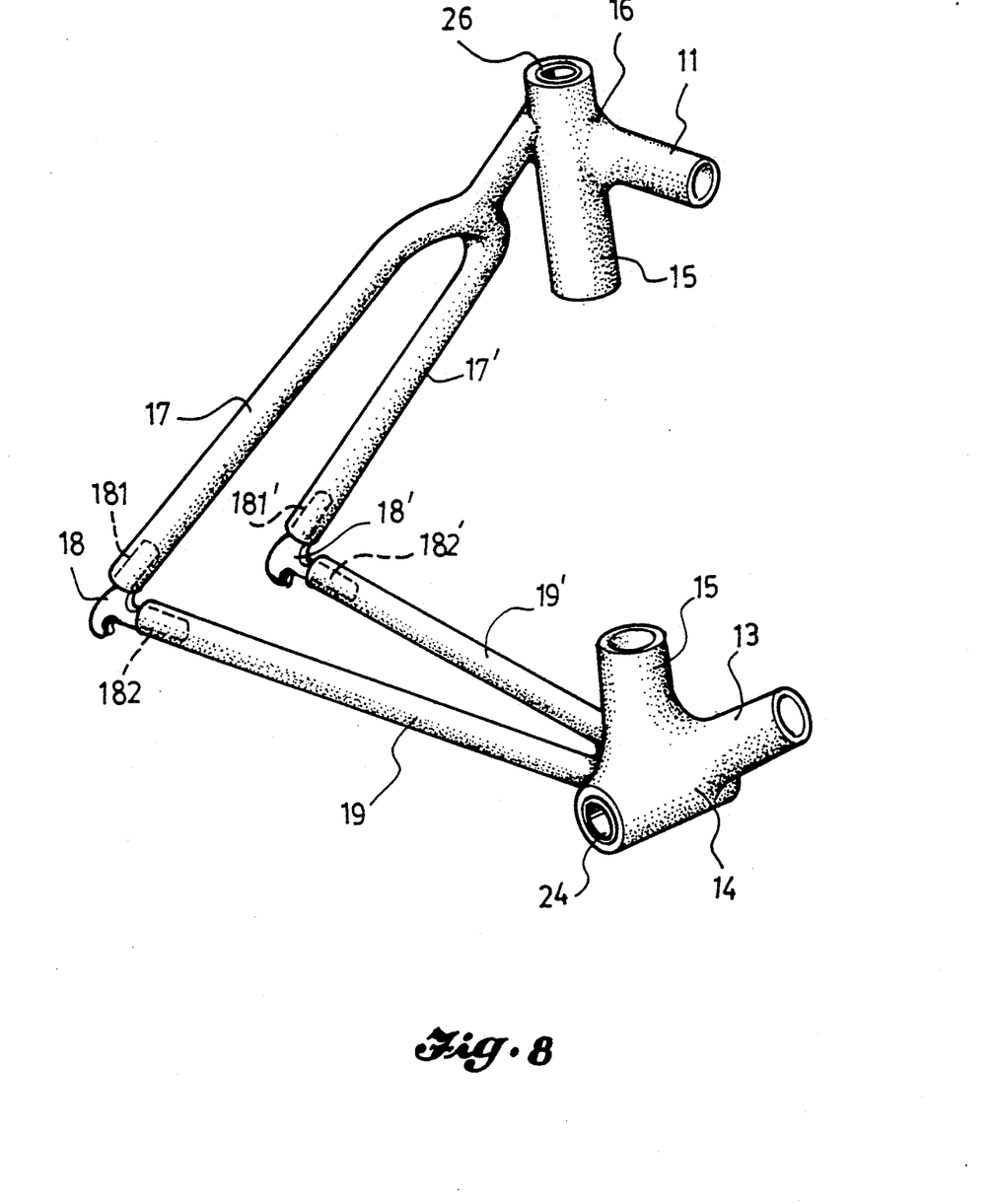
FIG. 8 is a perspective view illustrating substantially the rear triangles of a bicycle frame.

In FIG. 8, the seat stays 17, 17' connect to the chain stays 19, 19' by inserting the rear wheel dropouts 18, 18' therebetween with epoxy adhesive to form substantially a pair of rear triangles. Each of the rear wheel dropouts 18, 18' for supporting the axle of a rear wheel assembly (not shown) includes a first leg 181, 181' to be inserted in the seat stays 17, 17', and a second leg 182, 182' to be inserted in the chain stays 19, 19'.

Figure 9:
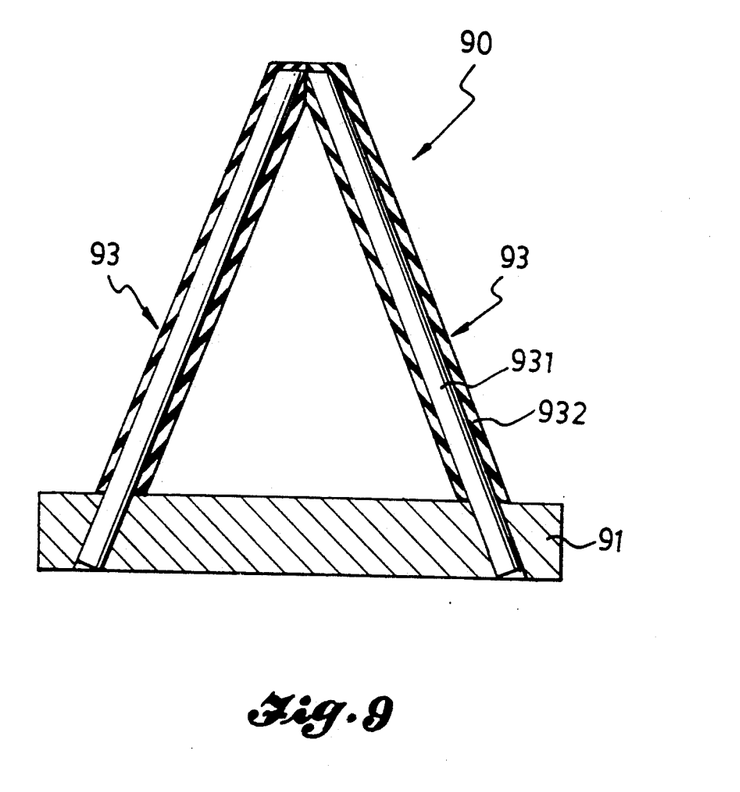
FIG. 9 is a sectional view illustrating a mount for laying up the steering support means, top tube and down tube of a bicycle frame.

In FIG. 9, a mount 90 for laying up the steering support means 12, top tube 11 and down tube 13 comprises a base 91 and two mandrels 93. Each mandrel 93 comprises an aluminum bar 931 with one end inserted in the base 91 and a rubber sleeve 932 detachably covering the outside of the aluminum bar 931. Rubber sleeves 932 supported by each aluminum bar 931 are symmetrical and form the corresponding shape of the top tube 11 and down tube 13. The prepreg is laid up around mandrels 93 to get sufficient plies. The steering support sleeve 22 can be embedded within the steering support means 12 when the steering support means 12 is laid up. The aluminum bars 931 and rubber sleeves 932 are pulled out in sequence to form the uncured steering support means 12, top tube 11 and down tube 13 of the prepreg lay-up. The way of making the seat tube 15 is merely to lay up the prepreg around a mandrel (not shown) and then pull out the mandrel. The uncured seat tube 15 and steering support means 12 associated with top tube 11 and down tube 13 connect with the cured rear triangles shown in FIG. 8 in a corresponding position by an adhesive composition with an overlapping amount of about 2.5 to 8 cm.

Figure 10:
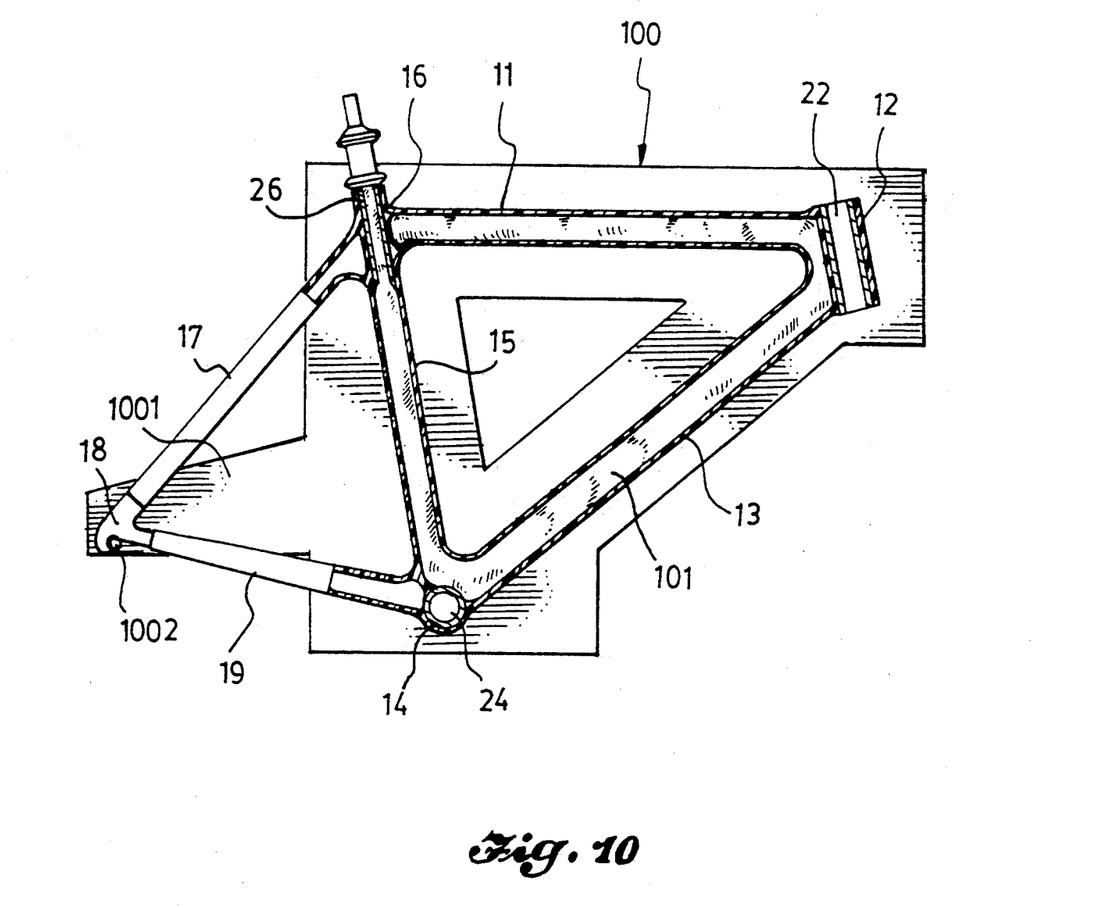
FIG. 10 is a plan view illustrating a bicycle frame with partial sections being placed in a lower mold piece.

In FIG. 10, a bladder 101 is placed in the frame part of the front triangle, which is routed from the top tube through the steering support means 12 and across the steering support sleeve 22, through the down tube 13, through the pedal support means 14 and across the bottom bracket sleeve 24, through the seat tube 15, through the seat support sleeve 26, to the open end of the seat support means 16. For molding the front triangle of the bicycle frame, the front triangle is placed in a female lower mold piece 100 which can be assembled and secured with the corresponding female upper mold piece (not shown, for clarity). The thickness of each of the mold pieces is about 8 to 10 cm. The lower mold piece 100 has an extension 1001 with a pin 1002 provided thereon for keeping the dropout 18 in position during the molding process. The bladder 101 is then inflated and the mold pieces are heated. When the front triangle is cured, the mold pieces are opened, and the whole bicycle frame can be removed.

Figure 11:
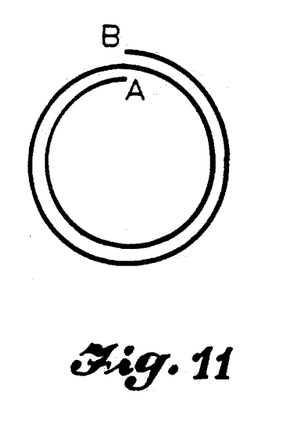
FIG. 11 is a schematic sectional view illustrating a type of laying up prepreg.
Figure 12:
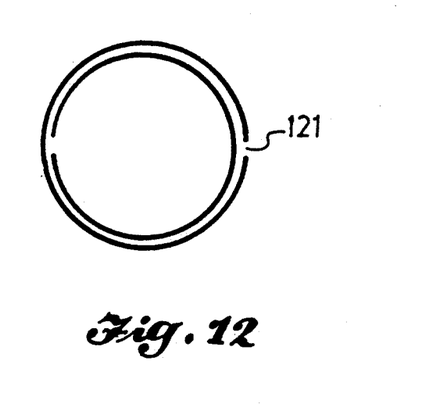
FIG. 12 is a schematic sectional view illustrating another type of laying up prepreg.

It should be noted that each piece of non-zero degree prepreg, such as 20°, 22°, 25°, 30°, and 45° can be laid-up by continuously rolling to two rounds as shown in FIG. 11 (from point A to point B), or lay up one round by alternating the gap 121 thereof as shown in FIG. 12 to avoid having gap underlying other gap for greater strength.

Furthermore, from the structural analysis of a bicycle frame, stress concentrations are all at the tubular portions near the steering support means, seat support means and pedal support means. However, by comparison, when forming the bicycle frame in accordance with the present invention, the steering support means together with the top tube and down tube, the seat support means together with corresponding parts of tubular portions, the pedal support means together with corresponding parts of tubular portions, are integrally formed to avoid stress concentrating problems.

It is apparent that although the invention has been described in connection with a preferred embodiment, those skilled in the art may make changes to certain features of the preferred embodiment without departing from the spirit and scope of the invention as defined in the appended claims.

We claim:

1. A method for manufacturing a composite bicycle frame, said bicycle frame comprising a top tube extending between steering support means for supporting a fork assembly and seat support means for supporting a seat assembly; a down tube extending between said steering support means and pedal support means for supporting a pedal assembly; a seat tube extending between said pedal support means and said seat support means; a pair of seat stays extending from said seat support means, said pair of seat stays being connected to a pair of chain stays extending from said pedal support means by a pair of rear wheel dropouts for supporting a rear wheel assembly; said method comprising the steps of:

(a) laying up said seat support means associated with parts of said top tube, seat tube and seat stays on a first mount with plies of prepreg and then removing said first mount; and laying up said seat stays on a second mount with plies of prepreg and then removing said second mount;

(b) connecting said seat stays to said seat support means to form a first combination of said seat stays and said seat support means associated with parts of said top tube and seat tube;

(c) curing said first combination in a first female molding unit and then removing said first combination;

(d) laying up said pedal support means associated with parts of said down tube, seat tube and chain stays on a third mount with plies of prepreg and then removing said third mount; and laying up said chain stays on a fourth mount with plies of prepreg and then removing said fourth mount;

(e) connecting said chain stays to said pedal support means to form a second combination of said chain stays and said pedal support means associated with parts of said down tube and seat tube;

(f) curing said second combination in a second female molding unit and then removing said second combination;

(g) connecting said seat stays of said first combination to said chain stays of said second combination by inserting said rear wheel dropouts therebetween with adhesive to form substantially a pair of rear triangles;

(h) laying up said steering support means associated with said top tube and down tube on a fifth mount with plies of prepreg and then removing said fifth mount; and laying up said seat tube around a mandrel and then pulling out said mandrel;

(i) connecting said seat tube and steering support means associated with said top tube and down tube to said rear triangles, wherein said top tube, down tube and seat tube form a front triangle; and (j) curing said front triangle in a third female molding unit to form said composite bicycle frame.

2. A method as claimed in claim 1 wherein each ply of prepreg is unidirectional and is capable of being laid up at angles between 0° to 45° relative to a longitudinal axis thereof.

3. A method as claimed in claim 1 wherein each of said first mount and third mount comprises two bases connected in a vertical position and three mandrels inserted in said bases.

4. A method as claimed in claim 3 wherein each of said mandrels comprises an aluminum bar with one end inserted in said base and a rubber sleeve detachably covering said aluminum bar.

5. A method as claimed in claim 1 wherein each of said second mount and fourth mount comprises a base and two mandrels inserted in said base.

6. A method as claimed in claim 5 wherein each of said mandrels comprises an aluminum bar with one end inserted in said base and a rubber sleeve detachably covering said aluminum bar.

7. A method as claimed in claim 1 wherein each of said first female molding unit and second female molding unit comprises a left side mold piece and a corresponding right side mold piece, and a lower mold piece and a corresponding upper mold piece.

8. A method as claimed in claim 1 wherein said third female molding unit comprises a lower mold piece and an upper mold piece.

9. A method as claimed in claim 1 wherein curing said first combination, second combination and front triangle comprise inflating at least one bladder placed in said plies of prepreg and heating said female molding unit.

* * * * *